UNITED STATES PATENT OFFICE.

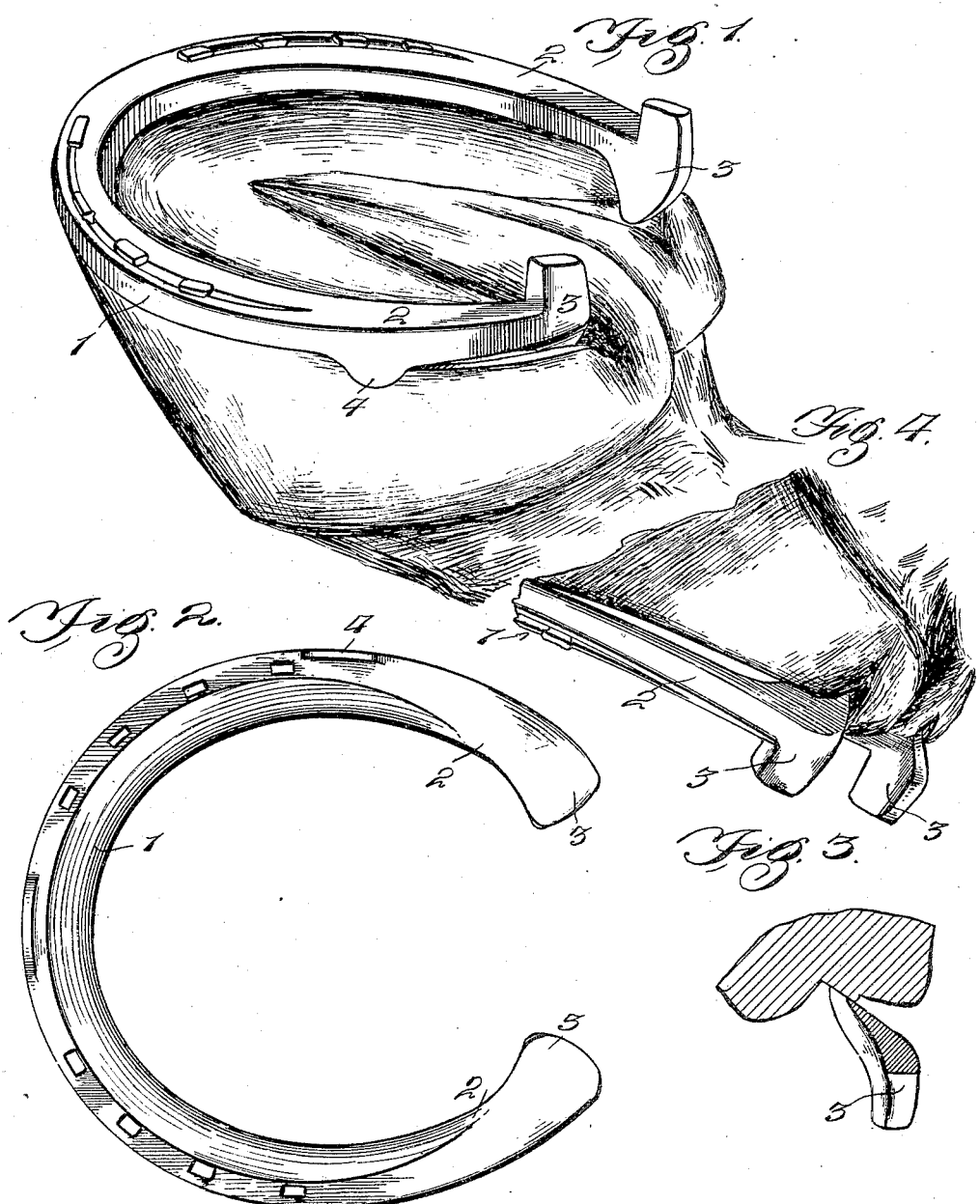

JOHN RICE, OF FORT COLLINS, COLORADO.

HORSESHOE.

SPECIFICATION forming part of Letters Patent No. 705,144, dated July 22, 1902.

Application filed June 5, 1901. Serial No. 63,304. (No model.)

*To all whom it may concern:*

Be it known that I, JOHN RICE, a citizen of the United States, residing at Fort Collins, in the county of Larimer and State of Colorado, have invented a new and useful Horseshoe, of which the following is a specification.

This invention relates to horseshoes; and the object of the present improvement is to provide a device of this class wherein the construction is such that various diseases and affections of the hoof will be relieved and cured, as well as habits of standing or walking due to hoof irregularities, and other body or limb abnormal conditions will be overcome.

The invention consists in the construction and arrangement of the several parts, which will be more fully hereinafter described and claimed.

In the drawings, Figure 1 is a perspective view of a hoof in inverted position, showing the improved shoe applied thereto. Fig. 2 is a top plan view of the shoe. Fig. 3 is a section through a portion of the heel extremity of the shoe and a part of the adjacent portion of the hoof. Fig. 4 is a perspective view of a portion of the shoe and hoof, showing the open space between the rear portion of the shoe and the adjacent part of the hoof.

Similar numerals of reference are employed to indicate corresponding parts in the several views.

The numeral 1 designates the improved shoe having the usual side portions 2, with inwardly and upwardly inclined ears 3. The rear extremities of the said portions 2 are bent downward to form spring-heels, and these extremities do not touch the hoof from about the last rear nail to the said ears, thus allowing play for the heel portion of the hoof to come down when spread by the said ears. The ears always occupy the position shown by Figs. 1 and 3 when in normal condition, and when the hoof comes down said ears spread the heel portion of the same in view of the inclination therewith in the direction set forth.

By the use of the improved shoe a contracted hoof can be brought back to its normal condition, fever produced in the hoof by the contraction thereof is relieved, decayed or diseased tissues of the inner part of the hoof are cured and replaced, the habit of standing on the tip of the toe is overcome, diseases known as "cocked ankle," "buck-knee," and "stove-shoulder" are dissipated and cured by permitting and forcing the natural spread of the hoof. At any point throughout the body of the shoe it is also proposed to use one or more upturned ears 4 to cure quarter or front cracks.

The salient features in the improved shoe are the upturned ears at the heel of the shoe, the rear spring extremities of the shoe, and the body-ears to cure cracks.

Having thus described the invention, what is claimed as new is—

A horseshoe having its rear portions bent downward from a point beginning approximately with the last nail-hole on each side of the shoe, thereby to hold the said portions normally out of engagement with the hoof of the animal when secured thereto, said portions being provided with the usual heels and with upward and inward inclined ears extending from the inner side edges of the heel portions, said ears converging toward each other and being approximately wedge-shaped in cross-section and adapted freely to move in the frog-creases of the hoof when the shoe is applied, substantially as and for the purpose specified.

In testimony that I claim the foregoing as my own I have hereto affixed my signature in the presence of two witnesses.

JOHN RICE.

Witnesses:
WILBER THOMAS,
S. F. WEBSTER.